US011919098B2

(12) United States Patent
Springer et al.

(10) Patent No.: US 11,919,098 B2
(45) Date of Patent: Mar. 5, 2024

(54) BLADE FOR A POWER TOOL (71) Applicant: MILWAUKEE ELECTRIC TOOL CORPORATION, Brookfield, WI (US)

(72) Inventors: John J. Springer, Milwaukee, WI (US); Courtney J. Burns, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 407 days.

(21) Appl. No.: 17/057,422

(22) PCT Filed: Sep. 30, 2020

(86) PCT No.: PCT/US2020/053451
§ 371 (c)(1),
(2) Date: Nov. 20, 2020

(87) PCT Pub. No.: WO2021/067382
PCT Pub. Date: Apr. 8, 2021

(65) Prior Publication Data
US 2022/0297213 A1    Sep. 22, 2022

Related U.S. Application Data

(60) Provisional application No. 62/908,816, filed on Oct. 1, 2019.

(51) Int. Cl.
*B23D 61/00* (2006.01)
(52) U.S. Cl.
CPC .................... *B23D 61/006* (2013.01)
(58) Field of Classification Search
CPC ............... B23D 61/006; B27B 19/006
See application file for complete search history.

(56) References Cited

U.S. PATENT DOCUMENTS 3,852,881 A * 12/1974 Treace ................. B23D 61/021
606/178
4,461,296 A    7/1984 Hodge
(Continued)

FOREIGN PATENT DOCUMENTS

CN    301210976 S    5/2010
CN    301391066 S    11/2010
(Continued)

OTHER PUBLICATIONS

Dremel, "Dremel MM430 Multi Knife Oscillating Tool Accessory," <https://www.amazon.com/Dremel-MM430-Multi-Oscillating-Accessory/dp/B0088L2SC6/ref=sr_1_19?crid=3M6EBGOQFQ1N6&dchild=1&keywords=dremel+mm430+ multi+knife+oscillating+tool+accessory&qid=1612472514&sprefix=dremel+MM430+multi+knife+oscillating+tool+%2Caps%2C153&sr=8-19> web page publicly available at least as early as Sep. 17, 2020.
(Continued)

*Primary Examiner* — Jennifer S Matthews
(74) *Attorney, Agent, or Firm* — Michael Best & Friedrich LLP (57) ABSTRACT

A blade having an attachment portion including an aperture defining an anchor center, the attachment portion configured to couple with an oscillating power tool. The blade also has a first blade portion having a first cutting edge, and a second blade portion having a second cutting edge. The first and second blade portions are generally coplanar and extend away from the attachment portion in an outward direction. The first cutting edge has a first horizontal linear dimension measured perpendicular to the outward direction, the first horizontal linear dimension being 3.5 to 4.0 inches to generally correspond with a first dimension of a single outlet gang box. The second cutting edge has a second horizontal linear dimension measured perpendicular to the outward direction, the second horizontal linear dimension being 2.1

(Continued)

to 2.6 inches to generally correspond with a second dimension of the single outlet gang box.

20 Claims, 8 Drawing Sheets (56) References Cited

U.S. PATENT DOCUMENTS

| | | | |
|---|---|---|---|
| 4,513,742 A | 4/1985 | Arnegger | |
| 4,589,458 A | 5/1986 | McCord, Jr. | |
| 4,617,930 A | 10/1986 | Saunders | |
| 5,087,261 A | 2/1992 | Ryd et al. | |
| 5,095,623 A | 3/1992 | Williams | |
| 5,306,285 A | 4/1994 | Miller et al. | |
| 5,382,249 A | 1/1995 | Fletcher | |
| 5,403,318 A | 4/1995 | Boehringer et al. | |
| 5,409,491 A | 4/1995 | Boehringer et al. | |
| 5,456,011 A * | 10/1995 | Inkster | B23D 61/006 30/503.5 |
| 6,022,353 A | 2/2000 | Fletcher et al. | |
| 6,503,253 B1 | 1/2003 | Fletcher et al. | |
| 6,684,481 B2 | 2/2004 | Kullmer | |
| 6,723,101 B2 | 4/2004 | Fletcher et al. | |
| 7,527,628 B2 | 5/2009 | Fletcher et al. | |
| 7,901,424 B2 | 3/2011 | Fletcher et al. | |
| 7,998,158 B2 | 8/2011 | Fletcher et al. | |
| D681,082 S | 4/2013 | Neal, Jr. et al. | |
| 8,875,611 B2 | 11/2014 | Mann | |
| 9,027,452 B2 | 5/2015 | Nagy et al. | |
| 9,522,432 B2 | 12/2016 | Staub | |
| 9,527,146 B2 | 12/2016 | Stoddart et al. | |
| D853,816 S | 7/2019 | Schaz et al. | |
| 10,792,740 B2 | 10/2020 | Karlen | |
| 2002/0104421 A1 | 8/2002 | Wurst | |
| 2003/0014067 A1 | 1/2003 | Kullmer et al. | |
| 2010/0288099 A1 | 11/2010 | Steiger | |
| 2012/0255417 A1 | 10/2012 | Frueh et al. | |
| 2012/0311876 A1 | 12/2012 | Zhang | |
| 2013/0331013 A1 | 12/2013 | Neal, Jr. et al. | |
| 2014/0068952 A1 | 3/2014 | Soreo et al. | |
| 2014/0190328 A1 | 7/2014 | Karlen | |
| 2014/0325855 A1 * | 11/2014 | Bozic | B27B 19/006 83/835 |
| 2015/0096422 A1 * | 4/2015 | Stoddart | B23D 61/021 83/835 |
| 2017/0291238 A1 | 10/2017 | Bernardi et al. | |
| 2019/0192170 A1 | 6/2019 | Nunan et al. | |
| 2019/0240752 A1 * | 8/2019 | Churchill | B23D 61/18 |

FOREIGN PATENT DOCUMENTS

| | | |
|---|---|---|
| CN | 301423943 S | 12/2010 |
| CN | 301481473 S | 3/2011 |
| CN | 301622403 S | 7/2011 |
| CN | 301713161 S | 11/2011 |
| CN | 102303168 A | 1/2012 |
| CN | 301952337 S | 6/2012 |
| CN | 102554888 A | 7/2012 |
| CN | 302313070 S | 2/2013 |
| CN | 302714085 S | 1/2014 |
| CN | 302714086 S | 1/2014 |
| CN | 303965797 S | 12/2016 |
| CN | 304011577 S | 1/2017 |
| CN | 304486632 S | 2/2018 |
| DE | 3833735 A1 | 4/1989 |
| DE | 4425456 A1 | 3/1996 |
| DE | 202004007929 U1 | 7/2004 |
| DE | 102008001234 A1 | 10/2009 |
| DE | 102009050195 A1 | 4/2011 |
| DE | 202011108736 U1 | 4/2012 |
| DE | 102010063103 A1 | 6/2012 |
| DE | 202012011311 U1 | 12/2012 |
| DE | 202013004983 U1 | 5/2014 |
| DE | 102013203613 A1 | 9/2014 |
| DE | 102013011638 B4 | 5/2015 |
| DE | 102013112888 A1 | 5/2015 |
| DE | 102011103880 B4 | 8/2016 |
| DE | 102017007351 A1 | 6/2018 |
| DE | 402015100781-0003 | 9/2019 |
| DE | 402015100781-0004 | 9/2019 |
| DE | 402015100781-0016 | 9/2019 |
| EP | EM 002418616-0004 | 3/2014 |
| EP | EM 002418616-0005 | 3/2014 |
| EP | EM 003442821-0001 | 11/2016 |
| EP | EM 003442821-0002 | 11/2016 |
| EP | 3213847 A1 * | 9/2017 ........... B23D 61/006 |
| KR | 1020150035412 A | 4/2015 |
| WO | DM040797 | 7/1997 |
| WO | 2008061835 A1 | 5/2008 |
| WO | 2013029857 A1 | 3/2013 |
| WO | 2013091965 A1 | 6/2013 |
| WO | 2013091982 A1 | 6/2013 |
| WO | 2013113432 A1 | 8/2013 |
| WO | 2015169143 A1 | 11/2015 |
| WO | 2016132320 A1 | 8/2016 |
| WO | DM097305 | 5/2017 |
| WO | 2018036061 A1 | 3/2018 |
| WO | 2021076750 A1 | 4/2021 |

OTHER PUBLICATIONS

Imperial Blades, "One Fit 4-in-1 Features Drywall Blade, 1PC," <https://www.amazon.com/One-Fit-Features-Drywall-Blade/dp/B07N39S21K/ref=sr_1_1?dchild=1&keywords=one+fit+4-in-1+features+drywall+blade%2C+1PC&qid=1612472336&sr=8-1> web page publicly available at least as early as Sep. 17, 2020.
International Search Report and Written Opinion for Application No. PCT/US2020/053451 dated Jan. 15, 2021 (13 pages).
Tava Surgical, "Product Catalog—vol. 9," © 2010 (308 pages).
Fein, "Fein General Catalog 2011," © 2011 (268 pages).
Fein, "Fein Power Tools 2006/2007," © 2006 (150 pages).
C. & E. Fein GmbH, "Multimaster Accessories," <https://web.archive.org/web/20100828095131/http://www.multimaster.info/fein-multimaster/de/de/products/accessories_cutting.php> web page publicly available at least as early as Aug. 28, 2010.
Fein, "Oscillating," Catalog Excerpt, pp. 174-206, publicly available at least as early as Sep. 30, 2019.
Extended European Search Report for Application No. 20871646.4 dated Nov. 8, 2023 (11 pages).

* cited by examiner

BLADE FOR A POWER TOOL

CROSS-REFERENCE TO RELATED APPLICATION

This application is a national phase filing under 35 U.S.C. 371 of International Application No. PCT/US2020/053451 filed on Sep. 30, 2020, which claims priority to U.S. Provisional Patent Application No. 62/908,816 filed on Oct. 1, 2019, the entire contents of which are incorporated herein by reference.

BACKGROUND

The present disclosure relates to a blade for power tools, and more particularly to a blade for an oscillating power tool.

SUMMARY

In one aspect, the disclosure provides a blade having an attachment portion including an aperture defining an anchor center, the attachment portion configured to couple with an oscillating power tool. The blade also has a first blade portion having a first cutting edge, and a second blade portion having a second cutting edge. The first and second blade portions are generally coplanar and extend away from the attachment portion in an outward direction. The first cutting edge has a first horizontal linear dimension measured perpendicular to the outward direction, the first horizontal linear dimension being 3.5 to 4.0 inches to generally correspond with a first dimension of a single outlet gang box. The second cutting edge has a second horizontal linear dimension measured perpendicular to the outward direction, the second horizontal linear dimension being 2.1 to 2.6 inches to generally correspond with a second dimension of the single outlet gang box.

In another aspect, the disclosure provides a blade having an attachment portion including an aperture defining an anchor center, the attachment portion configured to couple with an oscillating power tool. The blade also includes a first blade portion extending from the attachment portion, the first blade portion having a first cutting edge, and a second blade portion extending from the first blade portion, the second blade portion having a second cutting edge. The first and second blade portions are generally coplanar and extend away from the attachment portion in an outward direction, the first and second blade portions defining a longitudinal axis. The first and second cutting edges are disposed facing in the outward direction for push cutting. A horizontal reference line disposed perpendicular to the longitudinal axis in a plane of the first and second blade portions completely separates the first cutting edge from the second cutting edge to provide two-tiered push cutting. At least one of the first or second cutting edges is non-linear.

In another aspect, the disclosure provides a blade having an attachment portion including an aperture defining an anchor center, the attachment portion configured to couple with an oscillating power tool. The blade also includes a first blade portion extending from the attachment portion and having a first cutting edge configured for push cutting, and a second blade portion extending from the first blade portion and having a second cutting edge configured for push cutting. The first and second blade portions are generally coplanar and extend away from the attachment portion in a longitudinal direction. The second cutting edge is configured to be pushed a first distance to make a first linear cut in a workpiece without the first cutting edge engaging the workpiece. The first cutting edge is configured to be pushed a second distance greater than the first distance to extend the first linear cut colinearly. A difference between the first and second distances is at least 0.25 inches.

In another aspect, the disclosure provides a blade having an attachment portion including an aperture defining an anchor center, the attachment portion configured to couple with an oscillating power tool. The blade also includes a first blade portion extending from the attachment portion, the first blade portion having a first cutting edge, and a second blade portion extending from the first blade portion, the second blade portion having a second cutting edge. The first and second blade portions are generally coplanar and extend away from the attachment portion, the first and second blade portions defining a longitudinal axis. The first and second cutting edges overlap in a region that is bounded by two lines that extend parallel to the longitudinal axis.

In another aspect, the disclosure provides a blade having an attachment portion including an aperture defining an anchor center, the attachment portion configured to couple with an oscillating power tool. The blade also includes a first blade portion having a first cutting edge, the first blade portion extending from the attachment portion, and a second blade portion having a second cutting edge, the second blade portion extending from the first blade portion. The first and second blade portions are generally coplanar and extend away from the attachment portion, the first and second blade portions defining a longitudinal axis. The first cutting edge has a first horizontal linear dimension measured perpendicular to the outward direction. A longitudinal distance between the second cutting edge and the first cutting edge is measured as the shortest distance between the first and second cutting edges in a direction parallel to the outward direction. A ratio of the first horizontal linear dimension to the longitudinal distance is greater than or equal to 3 and less than or equal to 16.

In yet another aspect, the disclosure provides a blade for use with an oscillating power tool. The blade includes an attachment portion, a first blade portion extending from the attachment portion, and a second blade portion extending from the first blade portion. The attachment portion is configured to couple with the oscillating power tool and includes a central aperture defining an anchor center. The first and second blade portions are generally coplanar and extend away from the attachment portion in a direction defining a longitudinal axis. The first blade portion includes a first cutting edge having a first horizontal linear dimension measured perpendicular to the longitudinal axis in the plane. The second blade portion includes a second cutting edge having a second horizontal linear dimension measured perpendicular to the longitudinal axis in the plane. The second horizontal linear dimension is smaller than the first horizontal linear dimension. The second cutting edge is farther from the attachment portion than the first cutting edge.

The first horizontal linear dimension may be about 3.76 inches (95.5 mm), and the second horizontal linear dimension may be about 2.46 inches (62.5 mm). The first and second cutting edges may be offset in the longitudinal direction by about 0.4 inches (10.2 mm).

In another aspect, the disclosure provides a blade for use with an oscillating power tool. The blade includes an attachment portion, a first blade portion extending from the attachment portion, and a second blade portion extending from the first blade portion. The attachment portion is configured to couple with the oscillating power tool and includes a central aperture defining an anchor center. The first blade portion includes a first cutting edge that is generally arc-shaped and defines a first blade center. The first blade center is offset from the anchor center. The second blade portion includes a second cutting edge that is generally arc-shaped and defines a second blade center. The second blade center is offset from the anchor center.

The first and second blade portions extend in a direction away from the attachment portion defining a longitudinal axis. The first blade center is disposed along the longitudinal axis farther away from the first cutting edge than the anchor center. The second blade center is disposed along the longitudinal axis farther away from the second cutting edge than the anchor center.

Other aspects of the disclosure will become apparent by consideration of the detailed description and accompanying drawings.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways.

Figure 1:
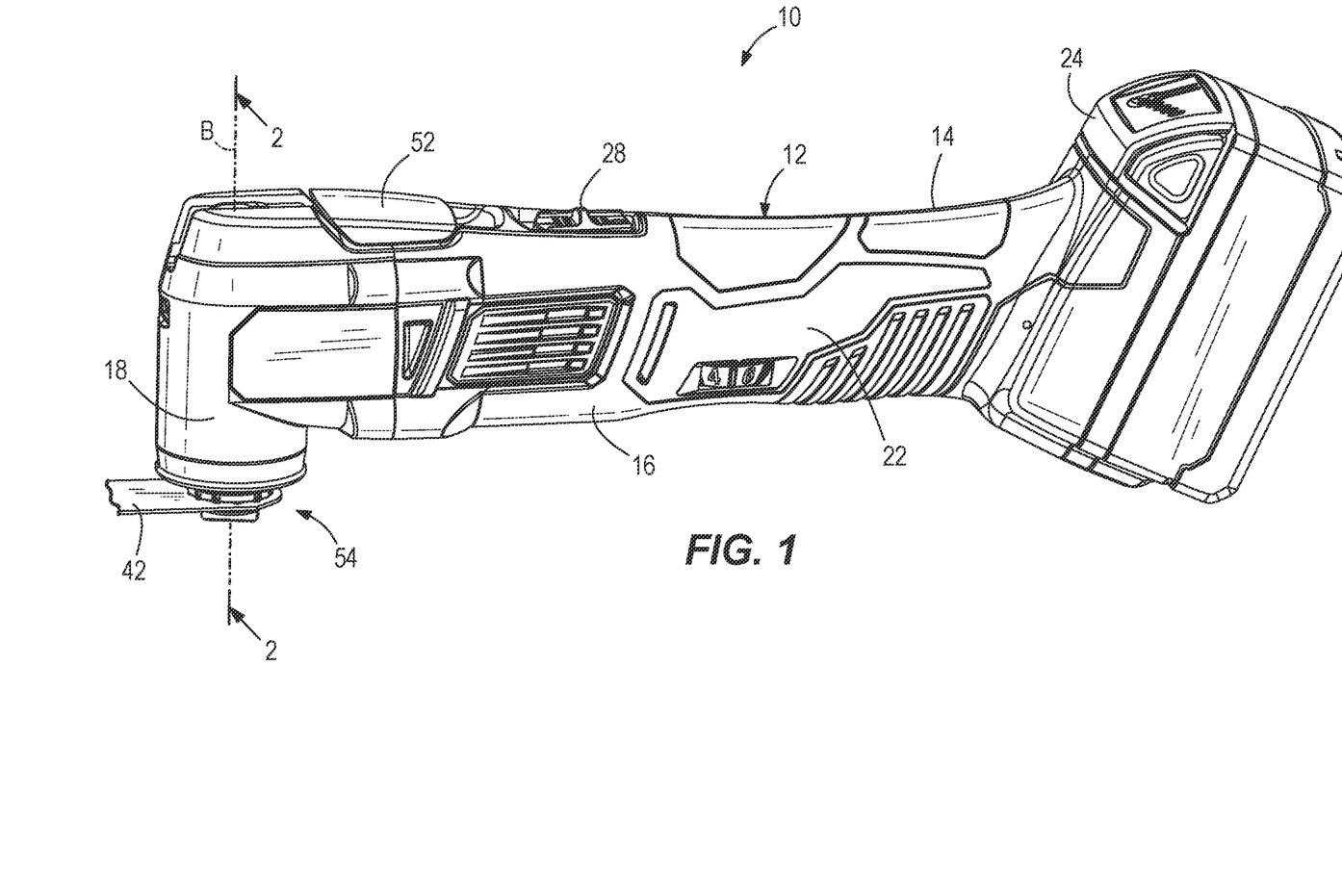
FIG. 1 is a side view of an oscillating power tool for receiving interchangeable working tools, such as blades.

FIG. 1 illustrates a power tool 10 according to one implementation of the disclosure. The power tool 10 includes a main body 12 having a housing 14 defining a handle 16 and a head 18. The head 18 is driven by a motor 20 (FIG. 2) disposed within the housing 14. The handle 16 includes a grip portion 22 providing a surface suitable for grasping by an operator to operate the power tool 10. The housing 14 generally encloses the motor 20.

The motor 20 in the illustrated implementation is an electric motor driven by a power source such as a battery pack 24 (FIG. 1), but may be powered by other power sources such as an AC power cord in other implementations. In yet other implementations, the power tool 10 may be pneumatically powered or powered by any other suitable power source and the motor 20 may be a pneumatic motor or other suitable type of motor. The motor 20 includes a motor drive shaft 26 (FIG. 2) extending therefrom and driven for rotation about a motor axis A. The motor 20 may be a variable speed or multi-speed motor. In other implementations, other suitable motors may be employed.

The battery pack 24 (FIG. 1) is a removable and rechargeable battery pack. In the illustrated implementation, the battery pack 24 may include a 12-volt battery pack, a 14.4-volt battery pack, an 18-volt battery pack, or any other suitable voltage, and includes Lithium-ion battery cells (not shown). Additionally or alternatively, the battery cells may have chemistries other than Lithium-ion such as, for example, Nickel Cadmium, Nickel Metal-Hydride, or the like. In other implementations, other suitable batteries and battery packs may be employed.

The main body 12 also includes a power actuator 28 (FIG. 1). The power actuator 28 is movably coupled with the housing 14 and is actuatable to power the motor 20, e.g., to electrically couple the battery pack 24 and the motor 20 to run the motor 20. The power actuator 28 may be a sliding actuator as shown, or in other implementations may include a trigger-style actuator, a button, a lever, a knob, etc.

Figure 2:
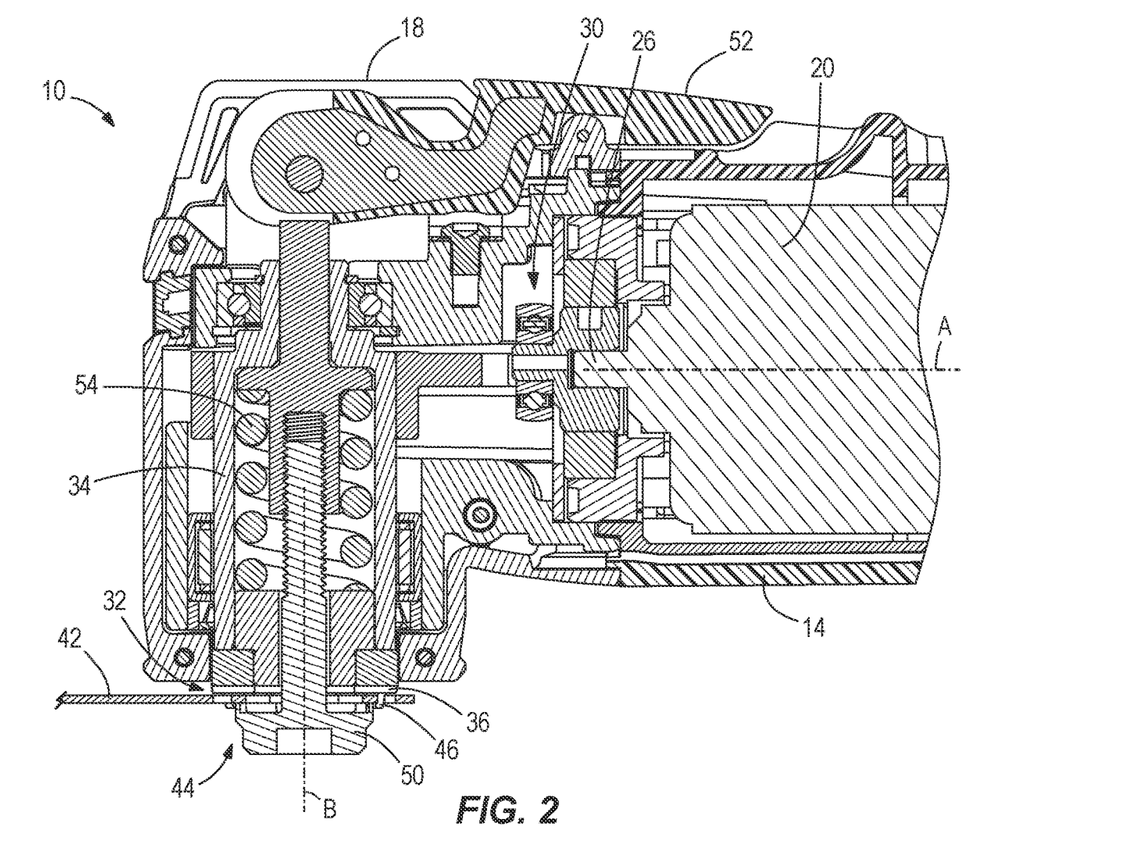
FIG. 2 is a side view cross-section of a portion of the oscillating power tool of FIG. 1.

The housing 14 also houses a drive mechanism 30 (FIG. 2) for converting rotary motion of the motor drive shaft 26 into oscillating motion of an output mechanism 32. As shown in FIG. 2, the output mechanism 32 includes a spindle 34 having an accessory holder 36 disposed at a distal end thereof. As shown in FIG. 2, the spindle 34 terminates, at a free end, with the accessory holder 36. The accessory holder 36 is configured to receive an accessory, such as a blade 42, and a clamping mechanism 44 (FIG. 2) clamps the blade 42 to the accessory holder 36. Specifically, the accessory holder 36 includes a first locating feature 46, such as a protrusion or protrusions sized and shaped for receiving the blade 42. The clamping mechanism 44 includes a clamping flange 50 at a distal end thereof for clamping the blade 42 to the accessory holder 36 for oscillating motion with the spindle 34. A clamping actuator 52, such as a lever, is configured to apply and release a clamping force from a biasing member 54, such as a spring. The spindle 34 defines an oscillation axis B, substantially perpendicular to the motor axis A, about which the spindle 34 oscillates, as will be described in greater detail below. In other implementations, other clamping actuators may be employed, such as a button, a knob, etc.

FIGS. 3-6 illustrate the blade 42 according to one implementation of the disclosure. The blade 42 is preferably formed from metal, which may include a metal, a metal alloy, a bi-metal, or any combination of metals, metal alloys, bi-metals, etc. For example, the metal may include hardened steel. The blade 42 may be formed from other materials in other implementations. The blade 42 includes an attachment portion 56, a first blade portion 58 extending from the attachment portion 56, and a second blade portion 60 extending from the first blade portion 58. The blade 42 is generally planar (as shown in the side view of FIG. 5) such that the attachment portion 56, the first blade portion 58, and the second blade portion 60 generally extend in a single plane, though slight deviations from a plane may exist. In other implementations, the first and second blade portions 58, 60 may be offset from the attachment portion 56 in a different plane, which may be generally parallel. In such an implementation, the first and second blade portions 58, 60 are coplanar with each other in one plane, the attachment portion 56 lies in a different plane, and a stepped portion connects the attachment portion 56 to the first and second blade portions 58, 60.

Figures 3, 4, 5:
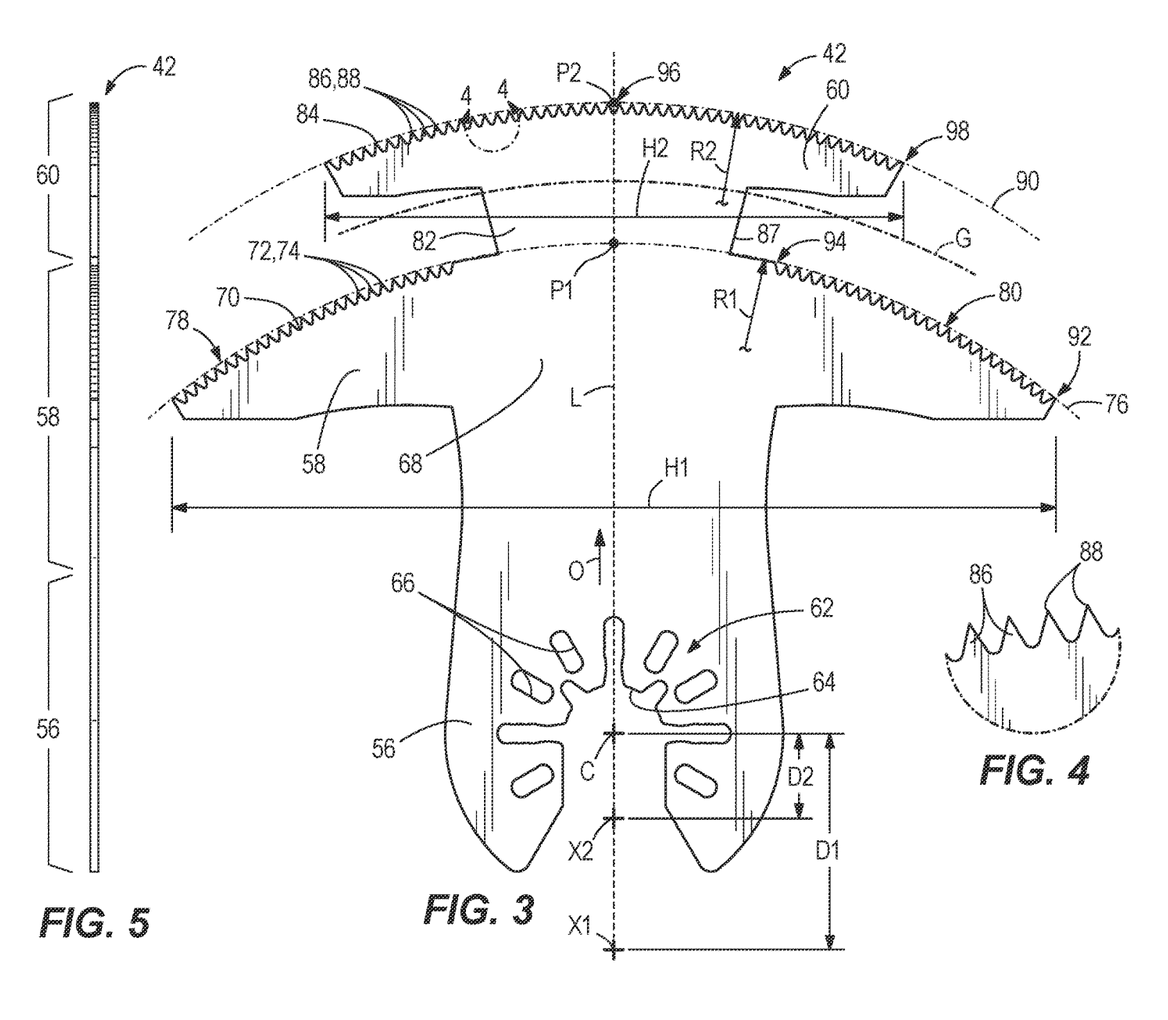
FIG. 3 is a top view of a blade attachable to the oscillating power tool of FIG. 1 according to one implementation of the disclosure.
FIG. 4 is a detail view of a portion of the blade shown in FIG. 3.
FIG. 5 is a side view of the blade shown in FIG. 3.

The attachment portion 56 includes a mounting aperture arrangement 62 including a central aperture 64 and a plurality of peripheral apertures 66 not in communication with the central aperture 64. The attachment portion 56 is configured to engage with the clamping mechanism 44 to securely and releasably connect the blade 42 to the oscillating tool 10. The central aperture 64 may be open, e.g., a slot, as shown in the illustrated implementation. In other implementations, the central aperture 64 may be a closed aperture. The central aperture 64 defines an anchor center C configured to intersect the oscillation axis B about which the blade 42 is configured to oscillate rotatingly when attached to and driven by the oscillating tool 10. The blade 42 defines a longitudinal axis L generally perpendicular to the oscillation axis B, the longitudinal axis L also intersecting the anchor center C and extending from the attachment portion through the first and second blade portions 58, 60. The longitudinal axis L extends from the attachment portion in an outward direction θ. More specifically, the longitudinal axis L may also be defined as extending from the anchor center C to a generally central point on a distal end of the blade 42, disposed generally centrally between the outer edges of the first and second blade portions 58, 60 and opposite the attachment portion. The longitudinal axis A may also be defined as an axis of symmetry of the blade 42. In other implementations, the longitudinal axis L extends from the anchor center C to the farthest point on the blade 42.

The first blade portion 58 includes a first body 68 extending from the attachment portion 56 along the longitudinal axis L in a fixed manner with respect to the attachment portion 56. The first blade portion 58 also includes a first cutting edge 70 at a distal end of the first blade portion 58 away from the anchor center C. In the illustrated implementation, the first cutting edge 70 is toothed, e.g., includes teeth 72. The tooth density of the teeth 72 is 18 teeth per inch (7 teeth per centimeter), but in other implementations the tooth density may be 14 to 24 teeth per inch (5 to 10 teeth per centimeter), or any other suitable tooth density. In the illustrated implementation, the teeth 72 each include a pointed tip 74. In other implementations, the first cutting edge 70 may include other types and configurations of teeth, and in yet other implementations the first cutting edge 70 may include other types of cutting surfaces, grinding surfaces, sanding surfaces, smoothing surfaces, etc.

In the illustrated implementation, the first cutting edge 70 is non-linear; however, the first cutting edge 70 may be linear in other implementations. More specifically, the first cutting edge 70 is curved and convex (e.g., bowed in the outward direction θ). Even more specifically, the first cutting edge 70, following the pointed tips 74 of the teeth 72, is generally arc-shaped extending along a portion of a first circle 76 having a first blade center X1 (defined at the center of the first circle 76) that is offset from the anchor center C. "Generally arc-shaped" may include a curve that follows the first circle 76 exactly or approximates the first circle 76, e.g., with slight deviations from the first circle 76, or with a series of line segments approximating the first circle 76, etc. The first circle 76 is generally defined by the tips 74 of the teeth 72, though in other implementations the first circle may be defined by any part of the first circle 76. Specifically, the first blade center X1 is disposed along the longitudinal axis L farther away from the first cutting edge 70 than the anchor center C, as measured from a point P1 on the first circle 76 that intersects the longitudinal axis L. The first blade center X1 may intersect the longitudinal axis L, and the first blade portion 58 may be approximately symmetrical about the longitudinal axis L. A distance D1 between the first blade center X1 and the anchor center C is about 1.0 inch+/−0.5 inches (25.4 mm+/−12.7 mm) in the illustrated implementation; however, the distance D1 may be between 1 and 7 inches (25.4 mm and 177.8 mm) in other implementations. In yet other implementations the distance D1 is greater than zero. This offset (distance D1) of the first blade center X1 in a direction away from the first cutting edge 70 improves control of the blade 42 during a cutting operation, reduces the amount of travel while using the blade 42, and provides a better cut. A radius of curvature R1 (e.g., a radius of the first circle 76) of the first cutting edge 70 is about 3.13 inches+/−0.25 inches (79.5 mm+/−6.4 mm). However, in other implementations, the radius of curvature R1 may be between 3 and 10 inches (76.2 and 254 mm). A horizontal linear dimension H1 of the first cutting edge 70 is measured across the entire span of the first cutting edge 70 in a direction perpendicular to the longitudinal axis L in the plane of the first blade portion 58. The horizontal linear dimension H1 is about 3.76 inches+/−0.25 inches (95.5 mm+/−6.4 mm), but may have other dimensions for other implementations. For example, in some implementations, the horizontal linear dimension H1 may be greater than 3 inches (76.2 mm). In other implementations, the horizontal linear dimension may be between 3 inches and 5 inches (76.2 mm and 127 mm).

The second blade portion 60 extends from the first blade portion 58 in a fixed manner. The second blade portion 60 may interrupt the first cutting edge 70 such that the first cutting edge 70 is split into two parts, with a first part 78 of the first cutting edge 70 being disposed on one side of the second blade portion 60 (with respect to the longitudinal axis L) and a second part 80 of the first cutting edge 70 being disposed on an opposite side of the second blade portion 60. In the illustrated implementation, the first part 78 and the second part 80 of the first cutting edge 70 are similarly sized (e.g., have the same lengths). In other implementations, the first part 78 and the second part 80 of the first cutting edge 70 may have different sizes (e.g., the first part 78 may be relatively longer than the second part 80, or vice versa). The second blade portion 60 includes a second body 82 extending from the first blade portion 58 generally along the longitudinal axis L. The second body 82 of the second blade portion 60 terminates with a second cutting edge 84 disposed farther from the anchor center C than the first cutting edge 70. The second body 82 includes a neck 87 narrower than the first cutting edge 70 and the second cutting edge 84 in the horizontal linear direction H1, H2.

In the illustrated implementation, the second cutting edge 84 is toothed, e.g., includes teeth 86. The second cutting edge 84 includes a tooth density of 18 teeth per inch (7 teeth per centimeter), but in other implementations the tooth density may be 14 to 24 teeth per inch (5 to 10 teeth per centimeter), or any other suitable tooth density. In the illustrated implementation, the teeth 86 each include a pointed tip 88 (shown enlarged in FIG. 4). In other implementations, the second cutting edge 84 may include other types and configurations of teeth, and in yet other implementations the second cutting edge 84 may include other types of cutting surfaces, grinding surfaces, sanding surfaces, smoothing surfaces, etc. In the illustrated implementation, the first and second cutting edges 70, 84 have the same type of cutting feature, i.e., teeth 72, 86, which also have the same tooth density and toothform. However, in other implementations, the first and second cutting edges 70, 84 may have different toothforms or have different types of cutting features compared to each other. Furthermore, the second cutting edge 84 may have different toothforms/cutting features, in any combination, along its extent (e.g., a first toothform/cutting feature on one side of the longitudinal axis L and a second toothform/cutting feature on the opposite side of the longitudinal axis L, or on opposite sides of any other transition point). Similarly, the first part 78 and the second part 80 of the first cutting edge 70 may have different toothforms/cutting features, in any combination, along their extents or compared to each other.

In the illustrated implementation, the second cutting edge 84 is non-linear; however, in other implementations the second cutting edge 84 may be linear. More specifically, the second cutting edge 84 is curved and convex (e.g., bowed in the outward direction θ). Even more specifically, the second cutting edge 84, following the pointed tips 88 of the teeth 86, is generally arc-shaped extending along a portion of a second circle 90 having a second blade center X2 that is offset from the anchor center C. "Generally arc-shaped" may include a curve that follows the second circle 90 exactly or approximates the second circle 90, e.g., with slight deviations from the second circle 90, or with a series of line segments approximating the second circle 90, etc. The second circle 90 is generally defined by the tips 88 of the teeth 86, though in other implementations the second circle 90 may be defined by any part of the second cutting edge 84. Specifically, the second blade center X2 is disposed along the longitudinal axis L farther away from the second cutting edge 84 than the anchor center C, as measured from a point P2 on the second circle 90 that intersects the longitudinal axis L. The second blade center X2 may intersect the longitudinal axis L, and the second blade portion 60 may be approximately symmetrical about the longitudinal axis L. A distance D2 between the second blade center X2 and the anchor center C is about 0.37 inches+/−0.25 inches (9.4 mm+/−6.4 mm) in the illustrated implementation; however, the distance D2 may be between 0.1 and 6 inches (2.54 and 152.4 mm) in other implementations. This offset (distance D2) in a direction away from the second cutting edge 84 improves control of the blade 42 during a cutting operation, reduces the amount of travel while using the blade 42, and provides a better cut. A radius of curvature R2 (e.g., a radius of the second circle 90) of the second cutting edge 84 is about 3.13 inches+/−0.25 inches (79.5 mm+/−6.4 mm. However, in other implementations, the radius of curvature R2 may be between 3 and 10 inches (76.2 mm and 254 mm). In the illustrated implementation, the radius of curvature R2 is the same as the radius of curvature R1; however, in other implementations the radii R1 R2 may differ. A horizontal linear dimension H2 of the second cutting edge 84 is measured across the entire span of the second cutting edge 84 perpendicular to the longitudinal axis L in the plane of the second blade portion 60. The horizontal linear dimension H2 is about 2.36 inches+/−0.25 inches (59.9 mm+/−6.4 mm), but may have other dimensions for other implementations. For example, in some implementations, the horizontal linear dimension H2 may be less than 3 inches (76.2 mm). In other implementations, the horizontal linear dimension H2 may be between 1 inch and 3 inches (25.4 and 76.2 mm). In general, the horizontal linear dimension H2 of the second cutting edge 84 is smaller than the horizontal linear dimension H1 of the first cutting edge 70.

Figure 6:
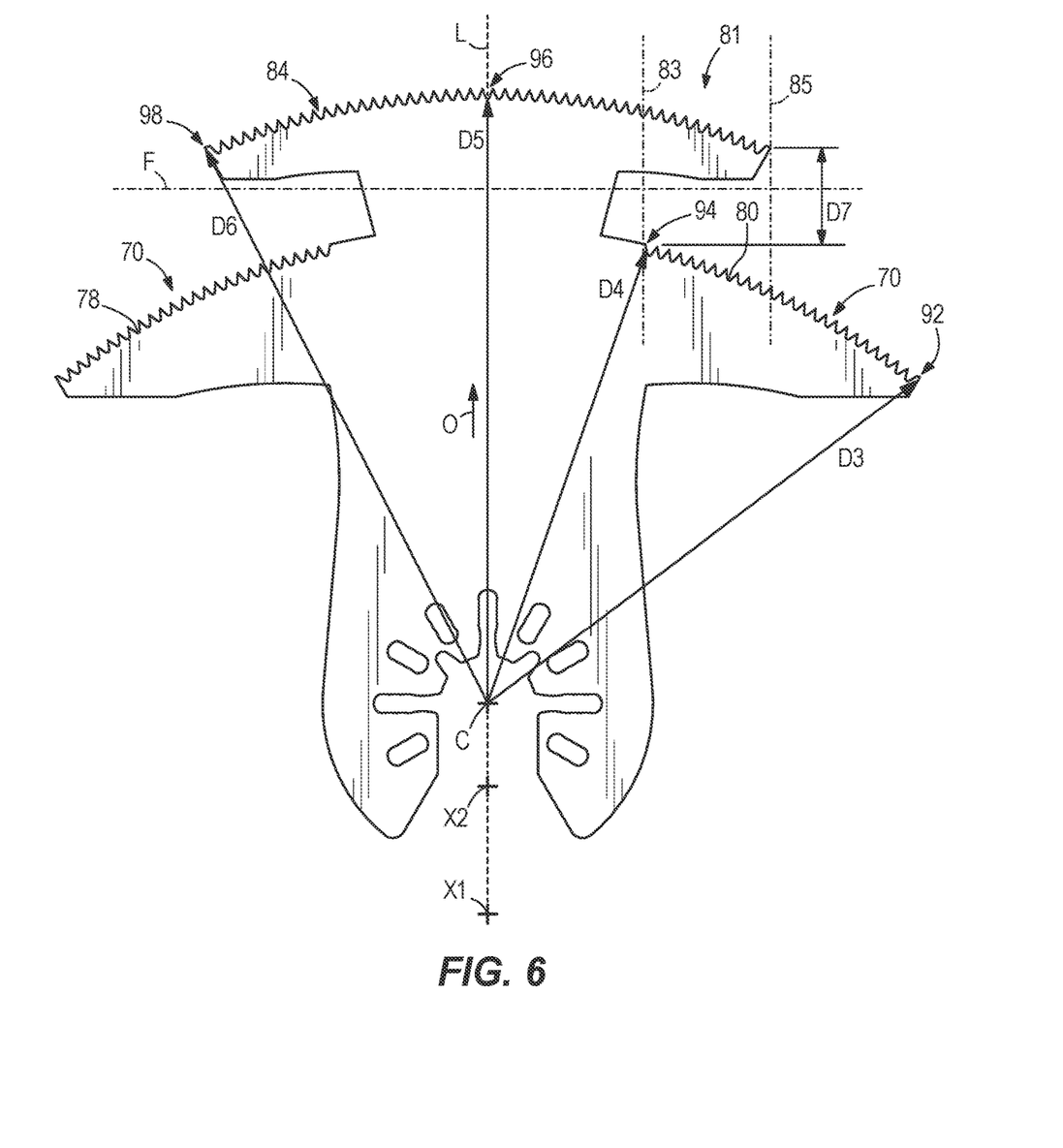
FIG. 6 is a duplicate of FIG. 3 for the purpose of further illustrating dimensions.

With reference to FIG. 6 (which illustrates the same view of the blade 42 as FIG. 3 but is included to illustrate further dimensions with clarity), a distance D3 from the anchor center C to an outer end 92 of the first part 78 of the first blade portion 58 is about 2.37 inches+/−0.125 inches (60.2 mm+/−3.2 mm). A distance D4 from the anchor center C to an inner end 94 of the first part 78 of the first blade portion 58 is about 2.12 inches+/−0.125 inches (53.8 mm+/−3.2 mm). In the illustrated implementation, these dimensions are substantially mirrored about the longitudinal axis L and apply to both the first and second parts 78, 80 of the first blade portion 58. The terms "substantially" and "generally" may be used herein to encompass "exactly" and "approximately". In other implementations, the first and second parts 78, 80 may have different dimensions, different sizes, different shapes, different curvatures, etc.

A distance D5 from the anchor center C to a center 96 of the second blade portion 60 (the center 96 being disposed at an intersection of the second cutting edge 84 with the longitudinal axis L) is about 2.73 inches+/−0.125 inches (69.3 mm+/−3.2 mm). A distance D6 from the anchor center C to an outer end 98 of the second blade portion 60 is about 2.75 inches+/−0.125 inches (69.9 mm+/−3.2 mm).

A longitudinal distance D7 (which may also be referred to as a longitudinal offset D7 or an outward offset D7) between the first cutting edge 70 and the second cutting edge 84 (measured in the direction of the longitudinal axis L between a top of the first cutting edge 70 and a bottom of the second cutting edge 84) is configured to be equal to or greater than a thickness of a workpiece (not shown) being cut so an operator can make a cut using the second cutting edge 84 without engaging the first cutting edge 70 in the workpiece, as will be described in greater detail below. In the illustrated implementation, the longitudinal offset D7 is about 0.4 inches+/−0.125 inches (10.1 mm+/−3.2 mm). In other implementations, D7 may be about 0.63 inches+/−0.125 inches (16.0 mm+/−3.2 mm) and may be at least 0.625 inches (15.8 mm) or more in some implementations. In the illustrated implementation, the longitudinal offset D7 is configured to accommodate the thickness of standard drywall such as ¼ inch (0.25 inch) (6.4 mm) thickness and ⅜ inch (0.375 inch) (9.5 mm) thickness. However, in other implementations, the longitudinal offset D7 may be configured to accommodate standard drywall with ½ inch (0.5 inch) (12.7 mm) or ⅝ inch (0.625 inch) (15.9 mm) thickness, as well as other thickness of drywall or other workpieces. In other implementations, the longitudinal offset D7 is at least 0.58 inches (14.7 mm). In other implementations, the longitudinal offset D7 is at least 0.5 inches (12.7 mm). In other implementations, the longitudinal offset D7 is at least 0.25 inches (6.4 mm). In still other implementations, the longitudinal offset D7 is less than 1.0 inches (25.4 mm). In further implementations, the longitudinal offset D7 is between 0.25 inches and 1.0 inches (12.7 mm and 25.4 mm). The other implementations may only accommodate some of the standard drywall thicknesses. Other longitudinal offsets may be employed accordingly for other types of workpieces having any thickness by employing an offset that is equal to or greater than the thickness of the workpiece.

The longitudinal offset D7 provides a gap so that a first cutting operation using the first cutting edge 70 is spaced from a second cutting operation using the second cutting edge 84 as the blade 42 is plunged during use. The first and second cutting operations may be collectively referred to as two-tiered cutting. Thus, the longitudinal offset D7 may be greater than zero such that the first and second cutting operations are discontinuous. In other words, no cutting edges engage the workpiece when the blade 42 is plunged to a depth region within the longitudinal offset D7, between the first and second cutting operations. A horizontal reference line F (extending to infinity) disposed perpendicular to the outward direction θ in a plane of the first and second blade portions 58, 60 completely separates the first cutting edge 70 from the second cutting edge 84 in the plane to provide two-tiered cutting. An arc-shaped reference line G centered at the anchor center C completely separates the first cutting edge 70 from the second cutting edge 84 in the plane to provide two-tiered cutting.

The first and second cutting edges 70, 84 are disposed facing in the outward direction θ for push cutting.

A ratio of the first horizontal linear dimension H1 to the longitudinal distance D7 is greater than or equal to 3 and less than or equal to 16. More specifically, the ratio may be greater than or equal to 4 and less than or equal to 12. Even more specifically, the ratio may be greater than or equal to 6 and less than or equal to 13. Even more specifically, the ratio may be greater than or equal to 8 and less than or equal to 11. Even more specifically, the ratio may be greater than or equal to 9 and less than or equal to 10.

The first and second cutting edges 70, 84 may overlap. For example, the first and second cutting edges 70, 84 overlap in a region 81 that is bounded by two lines 83, 85 that extend parallel to the longitudinal axis L. The region 81 is mirrored on both sides of the longitudinal axis L. In other words, the second cutting edge 84 overlaps the first part 78 of the first cutting edge 70 on one side of the longitudinal axis L and overlaps the second part 80 of the first cutting edge 70 on an opposite side of the longitudinal axis L.

A straight radial reference line (such as D6) may extend radially from the anchor center C and intersect the first and second cutting edges 70, 84. The straight radial reference line may be mirrored on the other side of the longitudinal axis L and also intersect the first and second cutting edges 70, 84 on the other side. Specifically, the straight radial reference line intersects the first part 78 of the first cutting edge 70 and the second cutting edge 84 on one side of the longitudinal axis L and the mirrored straight radial reference line intersects the second part 80 of the first cutting edge 70 and the second cutting edge 84 on the other side of the longitudinal axis L.

FIGS. 7-10 illustrate a blade 142 according to another implementation of the disclosure. The blade 142 is the same as the blade 42 except where differences are described below. As such, it should be understood that description of the blade 42 above and its alternatives apply to the blade 142 and need not be repeated below. Like parts are labeled with the same reference numerals plus "100". Like dimensions and axes that were labeled with a reference letter in FIGS. 3-6 are labeled with the same reference letter followed by a "1" in FIGS. 7-10. Like dimensions and axes that were labeled with a reference letter followed by a number in FIGS. 3-6 above are labeled with the same reference letter followed by the number plus "10" in FIGS. 7-10.

Figures 7, 8, 9:
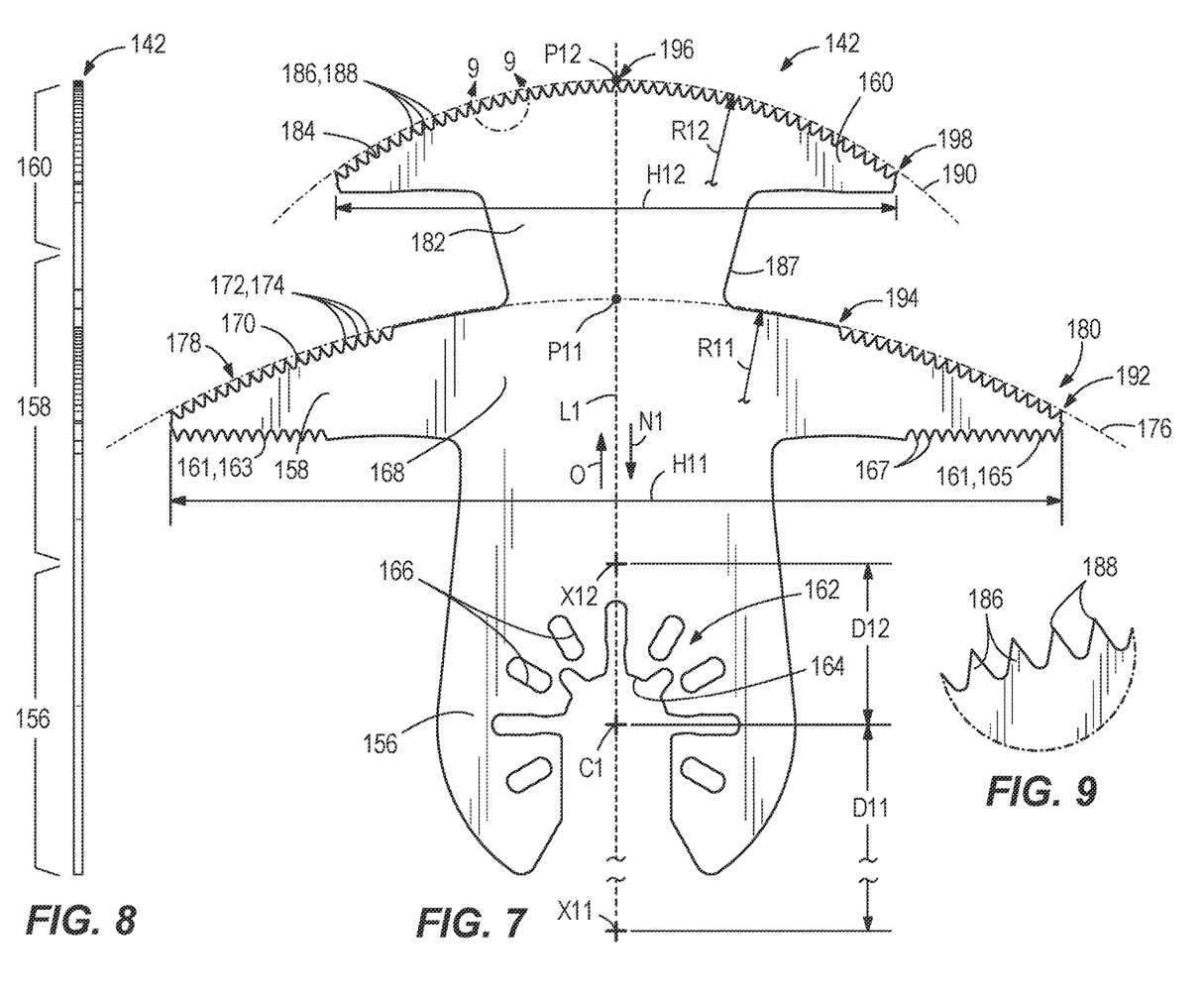
FIG. 7 is a top view of a blade attachable to the oscillating power tool of FIG. 1 according to another implementation of the disclosure.
FIG. 8 is a side view of the blade shown in FIG. 7.
FIG. 9 is a detail view of a portion of the blade shown in FIG. 7.
Figure 10:
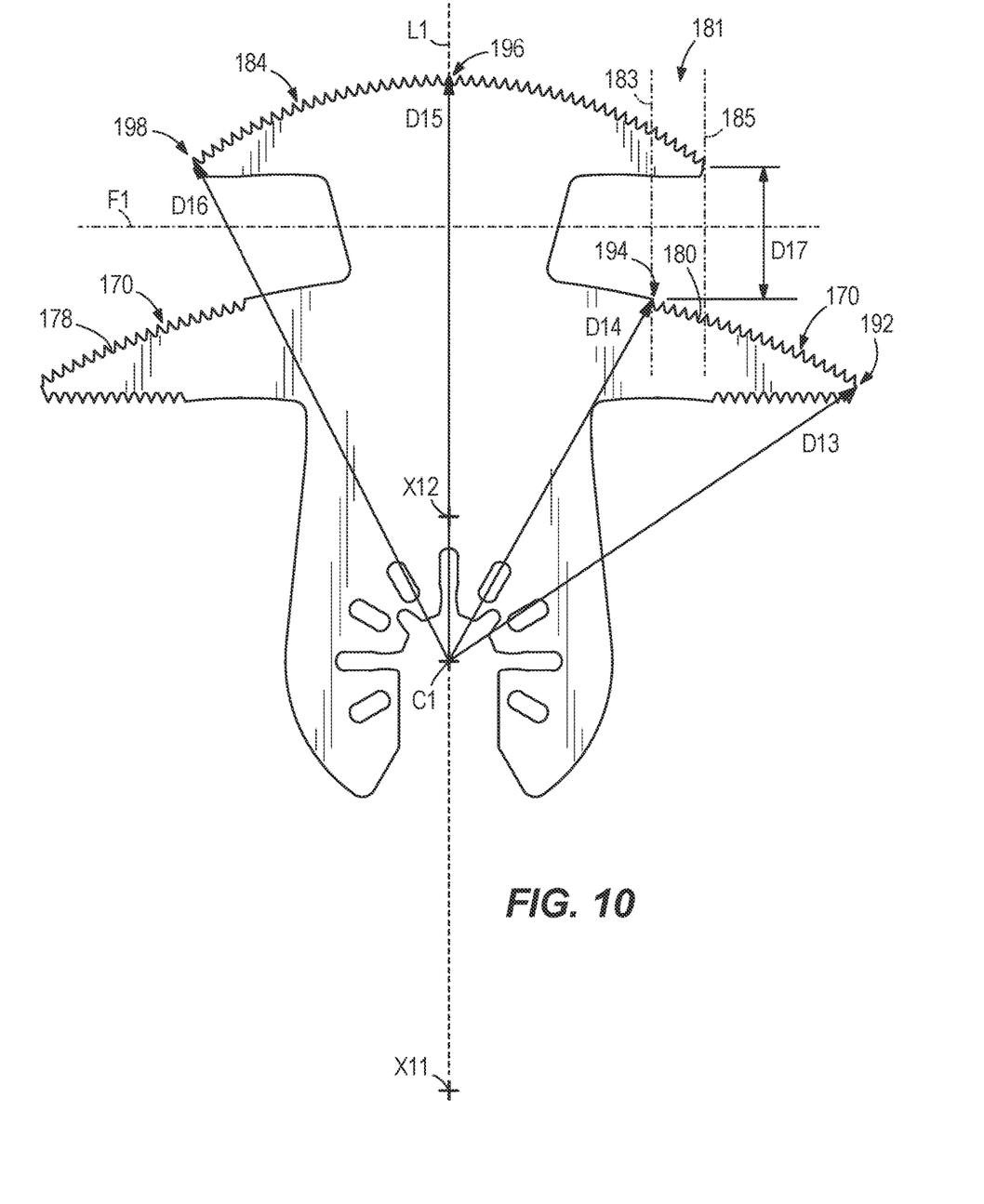
FIG. 10 is a duplicate of FIG. 7 for the purpose of further illustrating dimensions.

A distance D11 between the first blade center X11 and the anchor center C1 is about 2.24 inch+/−0.5 inches (56.9 mm+/−12.7 mm) in the illustrated implementation; however, the distance D11 may be between 1 and 7 inches (25.4 mm and 177.8 mm) in other implementations. A radius of curvature R11 (e.g., a radius of the first circle 176) of the first cutting edge 170 is about 4.0 inches+/−0.25 inches (101.6 mm+/−6.4 mm). However, in other implementations, the radius of curvature R11 may be between 3 and 10 inches (76.2 and 254 mm). A horizontal linear dimension H11 of the first cutting edge 170 is measured across the entire span of the first cutting edge 170 in a direction perpendicular to the longitudinal axis L1 in the plane of the first blade portion 158. The horizontal linear dimension H11 is about 3.7 inches+/−0.25 inches (94.3 mm+/−6.4 mm), but may have other dimensions for other implementations. For example, in some implementations, the horizontal linear dimension H11 may be greater than 3 inches (76.2 mm). In other implementations, the horizontal linear dimension H11 may be between 3 inches and 5 inches (76.2 mm and 127 mm).

A distance D12 between the second blade center X12 and the anchor center C1 is about 0.68 inches+/−0.25 inches (17.2 mm+/−6.4 mm) in the illustrated implementation; however, the distance D12 may be between 0.1 and 6 inches (2.54 and 152.4 mm) in other implementations. A radius of curvature R12 (e.g., a radius of the second circle 190) of the second cutting edge 184 is about 1.95 inches+/−0.25 inches (49.6 mm+/−6.4 mm). However, in other implementations, the radius of curvature R12 may be between 1 and 10 inches (25.4 mm and 254 mm). In the illustrated implementation, the radius of curvature R12 is less than the radius of curvature R11; however, in other implementations the radius R12 may be greater than or equal to the radius of curvature R11. A horizontal linear dimension H12 of the second cutting edge 184 is measured across the entire span of the second cutting edge 184 perpendicular to the longitudinal axis L1 in the plane of the second blade portion 160. The horizontal linear dimension H12 is about 2.3 inches+/−0.25 inches (59 mm+/−6.4 mm), but may have other dimensions for other implementations. For example, in some implementations, the horizontal linear dimension H12 may be less than 3 inches (76.2 mm). In other implementations, the horizontal linear dimension H12 may be between 1 inch and 3 inches (25.4 and 76.2 mm).

With reference to FIG. 10 (which illustrates the same view of the blade 142 as FIG. 7 but is included to illustrate further dimensions with clarity), a distance D13 from the anchor center C1 to an outer end 192 of the first part 178 of the first blade portion 158 is about 2.24 inches+/−0.125 inches (56.9 mm+/−3.2 mm). A distance D14 from the anchor center C1 to an inner end 194 of the first part 178 of the first blade portion 158 is about 1.89 inches+/−0.125 inches (48.1 mm+/−3.2 mm).

A distance D15 from the anchor center C1 to a center 196 of the second blade portion 160 (the center 196 being disposed at an intersection of the second cutting edge 184 with the longitudinal axis L1) is about 2.67 inches+/−0.125 inches (67.8 mm+/−3.2 mm). A distance D16 from the anchor center C1 to an outer end 198 of the second blade portion 160 is about 2.53 inches+/−0.125 inches (64.2 mm+/−3.2 mm).

In the illustrated implementation, the longitudinal offset D17 is about 0.6 inches+/−0.125 inches (15.2 mm+/−3.2 mm). In other implementations, D17 may be about 0.5 inches+/−0.125 inches (12.7 mm+/−3.2 mm) and may be at least 0.4 inches (10.2 mm) or more in some implementations.

A ratio of the first horizontal linear dimension H11 to the longitudinal distance D17 is greater than or equal to 3 and less than or equal to 16. More specifically, the ratio may be greater than or equal to 3 and less than or equal to 12. Even more specifically, the ratio may be greater than or equal to 4 and less than or equal to 10. Even more specifically, the ratio may be greater than or equal to 4 and less than or equal to 8. Even more specifically, the ratio may be greater than or equal to 5.7 and less than or equal to 6.7.

The first blade portion 158 also includes a third cutting edge 161 facing an inward direction N1 opposite the outward direction O1, configured for pull cutting. The third cutting edge 161 is substantially linear and extends substantially perpendicular to the longitudinal axis L1. The third cutting edge 161 includes a first portion 163 and a second portion 165 arranged symmetrically about the longitudinal axis L1. The first and second portions 163, 165 are discontinuous and separated by the attachment portion 156.

The third cutting edge 161 is toothed, e.g., includes teeth 167. The tooth density of the teeth 167 is 18 teeth per inch (7 teeth per centimeter), but in other implementations the tooth density may be 14 to 24 teeth per inch (5 to 10 teeth per centimeter), or any other suitable tooth density. In the illustrated implementation, the teeth 167 each include a pointed tip 169. In other implementations, the third cutting edge 161 may include other types and configurations of teeth, and in yet other implementations the third cutting edge 161 may include other types of cutting surfaces, grinding surfaces, sanding surfaces, smoothing surfaces, etc. In some implementations, the second blade portion 160 may also include a cutting edge facing the inward direction N1, configured for pull cutting.

FIGS. 11-14 illustrate a blade 242 according to another implementation of the disclosure. The blade 242 is the same as the blade 142 except where differences are described below. As such, it should be understood that description of the blade 142 above (including applicable description of the blade 42) and its alternatives apply to the blade 242 and need not be repeated below. Like parts are labeled with the same reference numerals plus "200". Like dimensions and axes that were labeled with a reference letter in FIGS. 3-6 are labeled with the same reference letter followed by a "2" in FIGS. 11-14. Like dimensions and axes that were labeled with a reference letter followed by a number in FIGS. 3-6 above are labeled with the same reference letter followed by the number plus "20" in FIGS. 11-14.

Figures 11, 13:
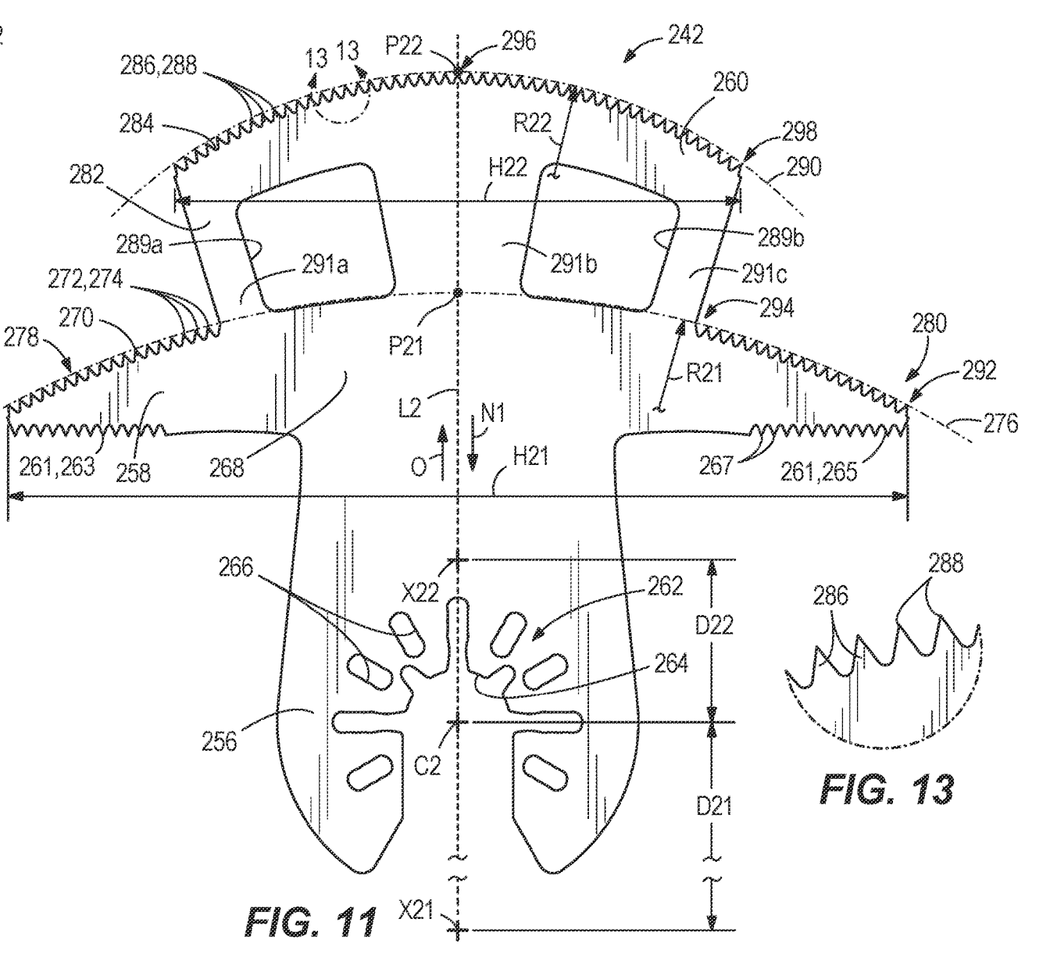
FIG. 11 is a top view of a blade attachable to the oscillating power tool of FIG. 1 according to another implementation of the disclosure.
FIG. 13 is a detail view of a portion of the blade shown in FIG. 11.
Figure 12:
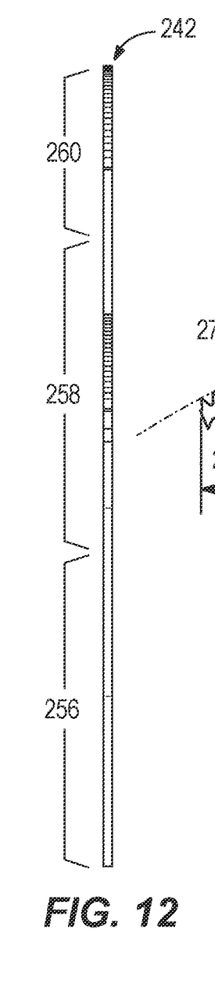
FIG. 12 is a side view of the blade shown in FIG. 11.
Figure 14:
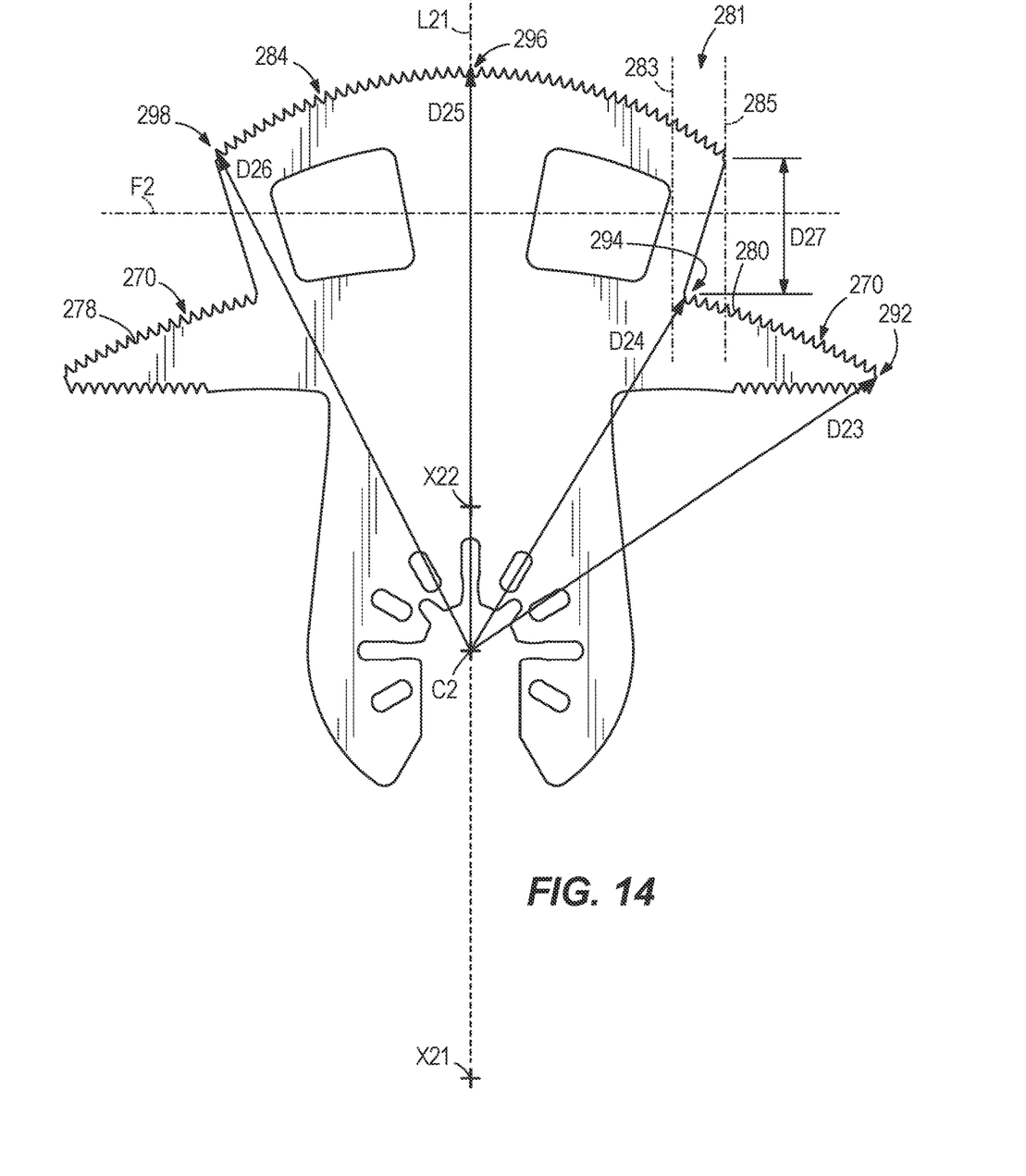
FIG. 14 is a duplicate of FIG. 11 for the purpose of further illustrating dimensions.

The second body 282 includes a pair of apertures 289a, 289b configured as through-holes disposed generally between the first cutting edge 270 and the second cutting edge 284. The pair of apertures 289a, 289b define three support arms 291a-291c in the second body 282 that support the second cutting edge 284. The three support arms 291a-291c extend from the first body 268 and provide rigidity to the blade 242. In other implementations, other numbers of apertures defining other numbers of support arms may be employed. For example, one aperture defining two support arms, three apertures defining four support arms, etc.

In operation, an operator attaches the blade 42 to the accessory holder 36 of the power tool 10. It should be understood that description of the operation of the blade 42 is the same as description of the operation of the blade 142 and the blade 242. As such, the description below of the operation of the blade 42 also describes operation of the blade 142 and the blade 242 and need not be described again.

The operator grips the grip portion 22, actuates the power actuator 28 to oscillate the blade 42, and makes a cut in the workpiece (not shown) by plunging the second blade portion 60 straight into the workpiece in the outward direction θ. The second blade portion 60 first engages a front surface of the workpiece and then cuts through to a rear surface of the workpiece. Specifically, the second cutting edge 84 makes a linear cut in the workpiece. For example, the workpiece may include drywall as discussed above.

In a first application, the operator may stop advancing the blade 42 towards/through the workpiece after the second cutting edge 84 cuts through the thickness of the workpiece and before the first cutting edge 70 engages the workpiece. Specifically, the operator may pull the blade 42 back to reverse the plunge before the first cutting edge 70 engages the workpiece. In this manner, the linear cut is approximately equal in length to the second horizontal linear dimension H2 of the second blade portion 60 (approximately equal includes some variation to account for the amount of oscillation and any other lateral movement of the blade 42 during the cutting operation).

In a second application, the operator may continue to advance/plunge the blade 42 towards/through the workpiece after the second cutting edge 84 makes a cut such that the first cutting edge 70 engages the workpiece to widen the linear cut. The operator may then pull the blade 42 back to reverse the plunge after the second cutting edge 84 widens the linear cut made by the first cutting edge 70. In this manner, the linear cut is approximately equal in length to the first horizontal linear dimension H1 of the first blade portion 58 (approximately equal includes some variation to account for the amount of oscillation and any other lateral movement of the blade 42 during the cutting operation).

In the implementations illustrated in FIGS. 7-10 and FIGS. 11-14, the operator may also employ the third cutting edge 161, 261 for pull cutting. Pull cutting includes initiating a cut in the rear surface of the workpiece and pulling the blade 142, 242 towards the operator such that the cut is made from the rear surface through to the front surface of the workpiece, opposite push cutting. For example, the operator may push the blade 142, 242 into the workpiece until the third cutting edge 161, 261 is through to the rear side of the workpiece and then shift the blade 142, 242 laterally to get the third cutting edge 161, 261 to engage the rear surface of the workpiece. Then the operator may pull the blade 142, 242 back towards the operator to perform a pull cut, cutting the workpiece from the rear surface to the front surface.

The dimensions H1 and H2 correspond approximately to the height and length dimensions (respectively) of a standard single outlet gang box (within reasonable tolerances for accommodating the box in a hole and accounting for blade oscillation and lateral movement). Using the first and second applications of the blade 42 provides two different length cuts without changing blades, and various combinations of cuts may be used to cut a rectangular hole in drywall having side dimensions that correspond to H1 and H2. As such, the operator may use the blade 42 to cut a hole for a single electrical box, a double electrical box, etc. without changing blades. Thus, the blade 42 provides two different linear cuts having different lengths depending on the depth of the plunge.

Thus, the disclosure provides, among other things, a blade 42 having serially disposed cutting edges 70, 84 attachable to an oscillating multi-tool 10 for making two different sized cuts (H1, H2) in a workpiece with a single accessory (e.g., without the need to change blades) by controlling the depth of the plunge.

Although the disclosure has been described in detail with reference to certain preferred implementations, variations and modifications exist within the scope and spirit of one or more independent aspects of the disclosure as described. Various features and advantages of the disclosure are set forth in the following claims.

What is claimed is:

1. A blade comprising:
   an attachment portion configured to couple with an oscillating power tool and defining an anchor center about which the blade is configured to oscillate;
   a first blade portion having a first cutting edge; and
   a second blade portion having a second cutting edge,
   wherein the first and second blade portions are generally coplanar and extend in a longitudinal direction away from the attachment portion, and wherein an offset separates the first and second cutting edges in the longitudinal direction to configure the first and second blade portions in a two-tiered arrangement configured to push cut, wherein the first blade portion and the second blade portion are approximately symmetrical about a longitudinal axis and outer ends of the second blade portion overlap cutting edges of the first blade portion, wherein the first cutting edge has a first horizontal linear dimension measured perpendicular to the longitudinal direction, the first horizontal linear dimension being 3.5 to 4.0 inches to generally correspond with a first dimension of a single outlet gang box, wherein the second cutting edge has a second horizontal linear dimension measured perpendicular to the longitudinal direction, the second horizontal linear dimension being 2.1 to 2.6 inches to generally correspond with a second dimension of the single outlet gang box.

2. The blade of claim 1, wherein the second cutting edge is configured to be pushed a first distance to make a first linear cut in a workpiece without the first cutting edge engaging the workpiece, and wherein the first cutting edge is configured to be pushed a second distance greater than the first distance to extend the first linear cut colinearly.

3. The blade of claim 1, wherein one of the first or second cutting edges is convexly curved, and wherein the other of the first or second cutting edges is either straight or convexly curved.

4. The blade of claim 1, wherein the first and second cutting edges are convexly curved.

5. The blade of claim 1, wherein the first and second cutting edges are arc-shaped, each having a center of curvature offset from the anchor center.

6. The blade of claim 1, wherein the first and second cutting edges are toothed.

7. The blade of claim 1, wherein the longitudinal offset includes at least 0.25 inches of separation between the first and second cutting edges in the longitudinal direction.

8. A blade comprising:
an attachment portion configured to couple with an oscillating power tool and defining an anchor center about which the blade is configured to oscillate;
a first blade portion having a first body portion extending from the attachment portion, and the first blade portion further having a first cutting edge; and
a second blade portion extending from the first blade portion to define a two-tiered blade arrangement, the second blade portion having a second cutting edge, wherein an entirety of the second cutting edge is disposed farther from the anchor center than an entirety of the first cutting edge, wherein the first and second blade portions are generally coplanar, wherein the first and second cutting edges are disposed in the same direction and configured to push cut,
wherein the first blade portion and the second blade portion are approximately symmetrical about a longitudinal axis,
wherein the first cutting edge defines a distal point farthest from the anchor center on the first cutting edge, and wherein the second cutting edge defines a proximal point closest to the anchor center on the second cutting edge, and wherein the proximal point of the second cutting edge is farther from the anchor center than the distal point of the first cutting edge, and wherein at least one of the first or second cutting edges is non-linear.

9. The blade of claim 8, wherein the first cutting edge has a first horizontal linear dimension measured perpendicular to the longitudinal axis, the first horizontal linear dimension being 3.5 to 4.0 inches to generally correspond with a first dimension of a single outlet gang box, and wherein the second cutting edge has a second horizontal linear dimension measured perpendicular to the longitudinal axis, the second horizontal linear dimension being 2.1 to 2.6 inches to generally correspond with a second dimension of the single outlet gang box.

10. The blade of claim 8, wherein a longitudinal offset of at least 0.25 inches separates the first and second cutting edges in the longitudinal direction.

11. The blade of claim 8, wherein at least one of the first or second blade portions includes a third cutting edge facing an opposite direction than the first and second cutting edges and configured to pull cut.

12. The blade of claim 8, wherein the first and second cutting edges are convexly curved.

13. The blade of claim 8, wherein the first and second cutting edges are toothed.

14. The blade of claim 8, wherein the proximal point of the second cutting edge is spaced from the distal point of the first cutting edge by an offset.

15. The blade of claim 8, further comprising a neck disposed between the first blade portion and the second blade portion.

16. A blade comprising:
an attachment portion configured to couple with an oscillating power tool and defining an anchor center about which the blade is configured to oscillate;
a first blade portion extending from the attachment portion and having a first cutting edge; and
a second blade portion extending from the first blade portion and having a second cutting edge,
wherein a longitudinal offset separates the first and second cutting edges in a longitudinal direction to configure the blade in a two-tiered arrangement configured to push cut,
wherein the first and second blade portions are generally coplanar, extend away from the attachment portion in a longitudinal direction, and are approximately symmetrical about a longitudinal axis,
wherein the second cutting edge is configured to be pushed a first distance to make a first linear cut in a workpiece without the first cutting edge engaging the workpiece, and wherein the first cutting edge is configured to be pushed a second distance greater than the first distance to extend the first linear cut colinearly,
wherein the longitudinal offset is at least 0.25 inches and configured to provide discontinuity between the two tiers of push-cutting.

17. The blade of claim 16, wherein at least one of the first or second cutting edges is non-linear.

18. The blade of claim 16, wherein the first cutting edge has a first horizontal linear dimension measured perpendicular to the longitudinal axis, the first horizontal linear dimension being 3.5 to 4.0 inches to generally correspond with a first dimension of a single outlet gang box, and wherein the second cutting edge has a second horizontal linear dimension measured perpendicular to the longitudinal axis, the second horizontal linear dimension being 2.1 to 2.6 inches to generally correspond with a second dimension of the single outlet gang box.

19. The blade of claim 16, wherein at least one of the first or second blade portions includes a third cutting edge facing an inward direction opposite the longitudinal direction for pull cutting.

20. The blade of claim 16, wherein the first and second cutting edges are convexly curved.

* * * * *